United States Patent
Taylor

(10) Patent No.: US 8,775,549 B1
(45) Date of Patent: Jul. 8, 2014

(54) METHODS, SYSTEMS, AND COMPUTER PROGRAM PRODUCTS FOR AUTOMATICALLY ADJUSTING A DATA REPLICATION RATE BASED ON A SPECIFIED QUALITY OF SERVICE (QOS) LEVEL

(75) Inventor: Jason Taylor, Apex, NC (US)

(73) Assignee: EMC Corporation, Hopkinton, MA (US)

( * ) Notice: Subject to any disclaimer, the term of this patent is extended or adjusted under 35 U.S.C. 154(b) by 831 days.

(21) Appl. No.: 11/904,359

(22) Filed: Sep. 27, 2007

(51) Int. Cl.
*G06F 15/16* (2006.01)

(52) U.S. Cl.
USPC ............................................ 709/217; 707/609

(58) Field of Classification Search
USPC ................... 709/217, 218, 219, 609
See application file for complete search history.

(56) References Cited

U.S. PATENT DOCUMENTS

| | | | |
|---|---|---|---|
| 6,487,562 | B1 | 11/2002 | Mason, Jr. et al. |
| 7,308,545 | B1 * | 12/2007 | Kekre et al. ............... 711/162 |
| 7,334,062 | B1 * | 2/2008 | Agarwal et al. .............. 710/52 |
| 7,433,943 | B1 * | 10/2008 | Ford .............................. 709/223 |
| 2003/0135609 | A1 * | 7/2003 | Carlson et al. ................ 709/224 |
| 2003/0208510 | A1 * | 11/2003 | Doyle et al. ................... 707/200 |
| 2004/0044761 | A1 * | 3/2004 | Phillipi et al. ................ 709/223 |
| 2005/0152397 | A1 * | 7/2005 | Bai et al. ........................ 370/468 |
| 2005/0172092 | A1 * | 8/2005 | Lam et al. ...................... 711/161 |
| 2006/0085608 | A1 * | 4/2006 | Saika ............................. 711/162 |
| 2006/0095696 | A1 * | 5/2006 | Amano et al. ................ 711/162 |
| 2006/0129771 | A1 * | 6/2006 | Dasgupta et al. ............. 711/162 |
| 2007/0130432 | A1 * | 6/2007 | Aigo .............................. 711/162 |
| 2008/0043643 | A1 * | 2/2008 | Thielman et al. .............. 370/260 |
| 2008/0154979 | A1 * | 6/2008 | Saitoh et al. ............... 707/202 |
| 2008/0159159 | A1 * | 7/2008 | Weinman ...................... 370/252 |
| 2008/0281784 | A1 * | 11/2008 | Zane et al. ........................ 707/3 |

OTHER PUBLICATIONS

"Navisphere Quality of Service Manager (NQM) Applied Technology," EMC White Paper, 13 pgs. (Oct. 2006).

\* cited by examiner

*Primary Examiner* — Harunur Rashid
(74) *Attorney, Agent, or Firm* — Jenkins, Wilson, Taylor & Hunt, P.A.

(57) ABSTRACT

According to one aspect, the subject matter described herein comprises methods, systems, and computer program products for automatically adjusting a replication rate based on a specified quality of service (QoS) level. The method includes providing for the specification of a QoS level associated with the performance of at least one application operating on a data storage system and determining a performance measure of the at least one application. A data replication rate of the data storage system is also determined and, based on the QoS level and the performance measure of the at least one application, the data replication rate is automatically adjusted.

20 Claims, 3 Drawing Sheets

METHODS, SYSTEMS, AND COMPUTER PROGRAM PRODUCTS FOR AUTOMATICALLY ADJUSTING A DATA REPLICATION RATE BASED ON A SPECIFIED QUALITY OF SERVICE (QOS) LEVEL

TECHNICAL FIELD

The subject matter described herein relates to adjusting a data replication rate in a data storage and replication system. More particularly, the subject matter described herein relates to methods, systems, and computer program products for automatically adjusting a data replication rate based on a specified quality of service (QoS) level.

BACKGROUND

In a data storage environment, data may be distributed across one or more physical data storage devices, such as one or more disk drives, and may be divided into logical representations of a physical memory address space. In a data storage environment, input/output (I/O) operations may request access to data in order to perform particular operations. I/O operations may include read, write, copy, and delete operations and are typically associated with an application or process operating in the data storage environment.

In addition to providing logical access to physically distributed data storage, data storage environments may support generating and maintaining multiple copies of data located in a distributed manner. As used herein, the term "replica" refers to a copy of data located in a data storage and replication system, and the term "replication" refers to the process of generating replicas (i.e. copying data). Therefore, data storage systems supporting data replication may be referred to as data storage and replication systems.

In a data storage and replication system, data may be replicated for a variety of purposes. For example, data may be replicated within an array based on user input, data may be replicated for continuously maintaining an up-to-date copies of source data (i.e. "data mirroring"), and/or data may be replicated for creating point-in-time backups of source data (i.e "snapshots"). Thus, data replication refers to copying data for any suitable purpose in a data storage and replication system, including mirroring and making snapshots.

In addition to the aspects described above, conventional data replication systems may allow a user to specify one or more quality of service (QoS) levels associated with applications operating on the system. A QoS level is an expression of a performance objective associated with an application or process operating in a data storage and replication environment. For example, a QoS level may include a limit to be placed on the use of a system setting or parameter, such as maximum I/O latency, maximum I/O queue depth, etc. Alternatively, a QoS level may include a high-level performance objective, such as the time period within which an application must complete a task.

In conventional QoS-enabled data storage and replication systems, a QoS level may fail to be achieved if a data replication process overutilizes a shared system resource. For example, a replication process may copy a large amount of data within a data storage array, thus requiring a large amount of system resources. Replication may heavily utilize I/O buffers, internal link bandwidth, external link bandwidth, disk resources, and CPU processing resources. Yet these system resources may also be shared by one or more applications whose performance may suffer as a result. This may include failing to achieve a specified QoS level in some instances that require access to the shared I/O buffers, internal link bandwidth, and CPU resources which were overutilized by the replication operation.

Therefore, one problem associated with conventional data storage and replication systems is that applications may be adversely affected by replication processes sharing the same system resources. Because data storage and replication systems contain a finite amount of available resources (i.e. link bandwidth, CPU resources, etc.), application performance may suffer in response to unmanaged spikes in data replication resource use.

One conventional solution to the potentially negative impact on application performance described above, including the failure to meet specified QoS objectives, that may result from an unmanaged data replication rate includes allowing a user to manually adjust the maximum allowable replication rate (MARR). For example, a user may manually set a globally-applicable and static maximum allowable replication rate for a data storage and replication system. After being initially set, the maximum allowable replication rate may be manually adjusted by the user by selecting a higher or lower allowable rate. After adjustment, the maximum allowable replication rate remains constant (i.e static) until it is manually adjusted again by the user. Typically, data storage and replication systems provide for a variety of settings corresponding to a range of maximum allowable replication rates. For example, "low" "medium" and "high" settings may correspond to maximum replication rates of 25 Mb/s, 50 Mb/s, and 75 Mb/s, respectively.

One problem associated with manually adjusting a data replication rate in a QoS-enabled data storage and replication system is that optimal allocation and/or balancing of system resources between applications and replication operations is unlikely to be achieved. Specifically, system resource demands change dynamically yet manually configured maximum allowable replication rates are static. At any given time, therefore, system resources may be over- or under-provisioned from the level necessary to meet specified QoS objectives. For example, in a data replication system where a maximum allowable replication rate is manually set to "high" and where both a high-priority application and a replication process share a specific set of system resources, the system resources utilized by the replication process at the "high" rate may prevent enough resources from being simultaneously available to the high-priority application. Thus, the high-priority application may become 'starved' for system resources and its performance may suffer accordingly (i.e. fail to meet its QoS objectives). Alternatively, if manual adjustment of the data replication rate is set too low, the replication process may not complete its duties fast enough to meet its QoS objective while, at the same time, there exists an over-provisioning of resources dedicated to non-replication applications. Either scenario results in suboptimal system resource utilization.

Accordingly, in light of these difficulties associated with conventional manual adjustment of the replication rate in data replication systems, there exists a need for improved methods, systems, and computer program products for automatically adjusting a replication rate based on a specified QoS level.

SUMMARY

According to one aspect, the subject matter described herein comprises methods, systems, and computer program products for automatically adjusting a replication rate based on a specified quality of service (QoS) level. The method includes providing for the specification of a QoS level associated with the performance of at least one application operating on a data storage system and determining a performance measure of the at least one application. A data replication rate of the data storage system is also determined and, based on the QoS level and the performance measure of the at least one application, the data replication rate is automatically adjusted.

According to another aspect, the subject matter includes a data storage and replication system for automatically adjusting a replication rate based on a specified QoS level. A data storage array is configured to store data, wherein at least some of the data is replicated. A replication manager is communicatively coupled to the data storage array for adjusting the data replication rate of data located on the data storage array. Adjusting the data replication rate includes receiving one or more instructions associated with the data replication rate and adjusting one or more performance parameters. A quality of service (QoS) manager is configured to provide for the specification of a QoS level associated with the performance of at least one application operating on a data storage system and to determine a performance measure of the at least one application. QoS manager is further configured to determine a data replication rate of the data storage system and to automatically adjust the data replication rate based on the QoS level and the performance measure of the at least one application.

As used herein, the term "QoS level" refers to a level of performance associated with an application or process operating in a data storage environment. A QoS level may specify a minimum performance objective, a maximum performance limit, a target performance level and/or a performance range. For example, a QoS level may include, "an application must complete its task within 3 hours" or, "no more than 10% of available bandwidth shall be dedicated to data replication." In addition, QoS levels may be categorized into "guarantee-based" and "probability-based" performance objectives. A guarantee-based QoS level may indicate an absolute minimum performance level whereas a probability-based QoS level may indicate a range of likelihoods associated with achieving the desired performance level.

As used herein, the term "performance parameter" refers to a measurable and adjustable aspect of data storage system performance. Some performance parameters may be measured and adjusted directly while other performance parameters may be adjusted and measured indirectly based on other system parameters. For example, performance parameters, such as I/O queue depth, bandwidth, and CPU utilization may be measured and directly adjustable in order to affect system performance. Alternately, performance parameters such as jitter, delay, and the number of dropped packets may be directly measurable but not directly adjustable. Rather, they may be indirectly adjusted by adjusting other performance parameters such as I/O queue depth, bandwidth, and CPU utilization.

As used herein, the term "data replication rate" refers to the speed at which data is copied from a source to a destination, where at least one of the source and destination are a member of the data replication system. For example, the data replication rate of data copied from a local data storage array to a remote data storage array may be measured by monitoring the transmission rate of the replicated data packets traversing the link connecting the local and remote arrays.

The subject matter described herein for automatically adjusting a replication rate based on a specified QoS level may be implemented using a computer program product comprising computer executable instructions embodied in a computer-readable medium. Exemplary computer-readable media suitable for implementing the subject matter described herein include chip memory devices, disk memory devices, programmable logic devices, and application specific integrated circuits. In addition, a computer-readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

In view of the problems described above with respect to conventional manual adjustment of replication rates, the subject matter described herein provides for automatic adjustment of a replication rate based on a specified quality of service (QoS) level. Where previously conventional systems provided for manual adjustment of the replication rate, resulting in possible over-provisioning or under-provisioning of system resources for a specified QoS level, the subject matter described herein provides for automatically adjusting the replication rate based on a specified QoS level. By automatically adjusting the replication rate based on a specified QoS level, over- or under-provisioning of system resources is reduced. Automatic adjustment of a replication rate based on a specified QoS level may be implemented in a data storage and replication system, as will be described in more detail below.

Figure 1:
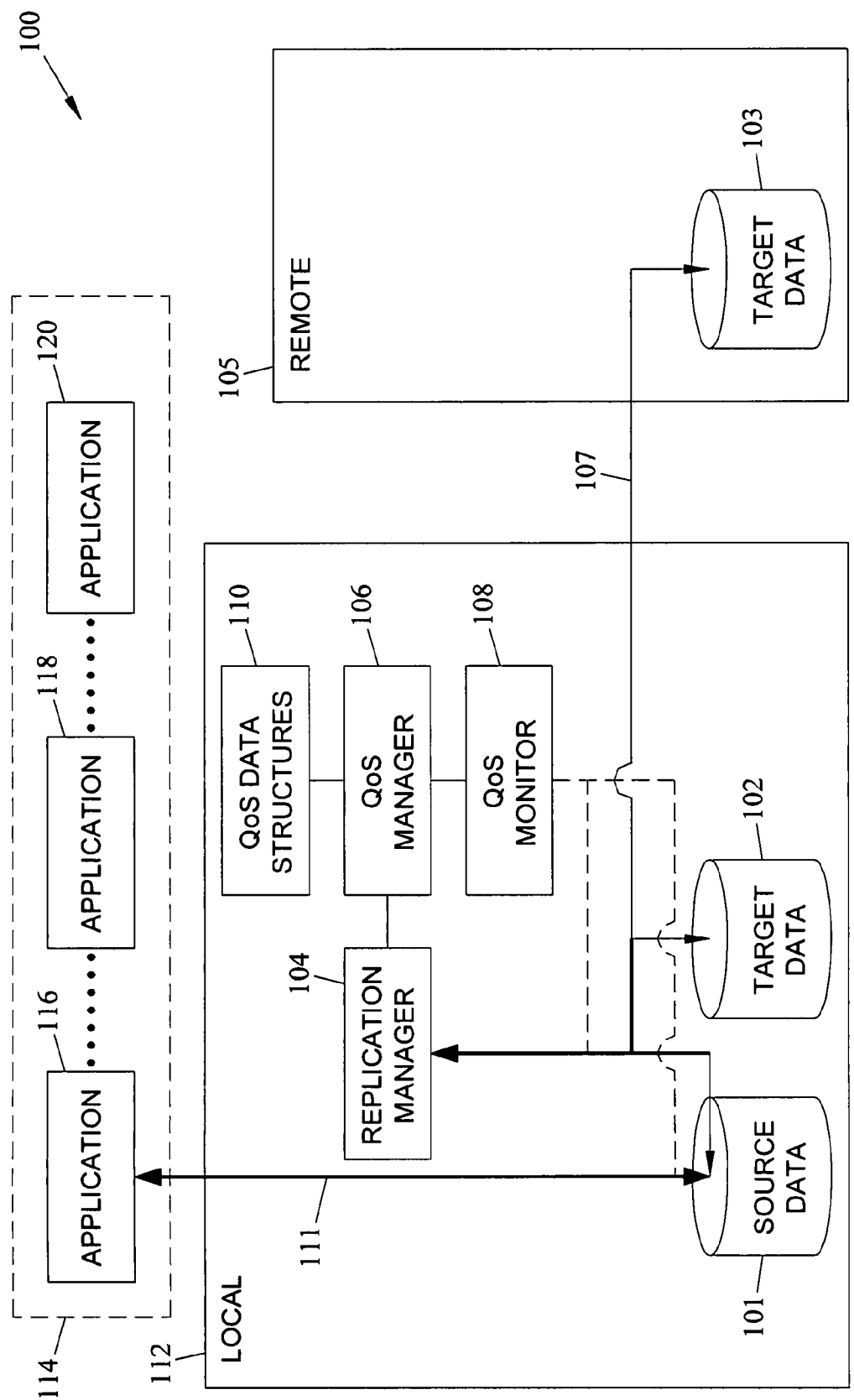
FIG. 1 is a block diagram of an exemplary data storage and replication system for automatically adjusting a data replication rate based on a specified QoS level according to an embodiment of the subject matter described herein.

FIG. 1 is a block diagram of an exemplary data storage and replication system for automatically adjusting a replication rate based on a specified QoS level according to an embodiment of the subject matter described herein. In FIG. 1, system 100 may include data storage 101 for storing data, replication manager 104 for managing the replication of data, QoS manager 106 for managing the performance of system 100 based on QoS levels, and applications 114 for accessing shared system resources including data located on data storage 101. Data located on source data storage 101 may be replicated to local target data storage 102 and/or remote target data storage 103, respectively, via a suitable data link. Data storage 101 may include a single array of data storage elements, such as disks or plural array of data storage elements or disks. A storage processor (not shown) may be provided to execute programs that read from and write data to data storage 101. The processing cycles of the storage processor are one example of a shared system resource that it may be desirable to control QoS provided to one or more application that access data stored in data storage 101. Another example of a system resource for which it may be desirable to control QoS is link bandwidth of data links between applications and data storage 101, between data storage 101 and local target data storage 102, and between data storage 101 and remote target data storage 103.

One commercially available example of data storage and replication system 112 includes the CLARiiON® platform available from EMC Corporation of Hopkinton, Mass. It is appreciated that the subject matter described herein may be stored in a computer readable medium for execution by a computer such as software, hardware, and/or firmware such that when executed, may perform steps described below for automatically adjusting replication a rates based on a specified QoS level.

As stated above, data storage 101-103 may include one or more data storage devices for storing data and one or more hardware and/or software entities for managing (i.e. read, write, copy, delete) data located on the data storage devices. Data storage devices within data storage 101-103 may include any suitable data storage devices including, but not limited to, magnetic disks, optical disks, and magnetic tape devices. Data may be distributed across one or more data storage devices and may be addressed independently from its physical location, for example, by directing I/O requests to logical addresses rather than to physical disk drives.

Replication manager 104 may control the replication rate of data to and from data storage 101, as well as between storage locations within data storage 101. For example, replication manager 104 may control the replication of data from source data storage 101 to either of local target data storage, such as data storage 102 and remote target data storage 103. The management of data replication by replication manager 104 may include, for example, queuing read and write requests directed to data storage 101, adjusting I/O queue depth, increasing or decreasing a number of execution threads associated with data replication, or adjusting any other performance parameter associated with the replication of data. While a single replication manager 104 is shown in FIG. 1, it is appreciated that data storage system 100 may also include multiple replication managers 104 without departing from the scope of the subject matter described herein.

Quality of service (QoS) manager 106 may be configured to manage one or more specified QoS levels associated with applications 114. For example, QoS manager 106 may be configured to allocate access to shared system resources among applications 114 in order to satisfy QoS levels specified for each application. Typically, specified QoS levels may be satisfied by balancing the needs of various applications, including the needs of applications which may vary over time. However, some combinations of QoS levels may never be satisfied, even with optimal resource allocation by QoS manager. For example, a first QoS level specifying a requirement that a first application reserve 60% of available bandwidth and a second QoS level specifying that 60% of available bandwidth be reserved for a second application cannot both be satisfied. The above-described QoS levels are conflicting on their face. In another example, a first QoS level may specify that a first application is allowed to use up to 70% of available bandwidth and a second QoS level may specify that 40% of available bandwidth be reserved for a second application. If the first application never uses more than 60% of available bandwidth, both QoS levels would be satisfied. However, in the event that the first application uses more than 60% of available bandwidth, a violation of one or both specified QoS levels would occur.

QoS levels associated with applications operating on system 100 may be stored in QoS data structures 110 and accessed by QoS manager 106. QoS levels may be inputted into QoS data structures 110 via a UI (not shown), such as a command line interface (CLI) or graphical user interface (GUI). QoS manager 106 may communicate with QoS data structures 110 for retrieving and updating QoS levels. While QoS levels stored in QoS data structures may be changed at any time using suitable commands, it is appreciated that, for purposes of illustration, an initial set of QoS levels may be inputted and stored in QoS data structures 106 which are not updated and therefore remain static during the automatic adjustment of the replication rate.

QoS monitor 108 may be communicatively coupled to QoS manager 106, application/source data communications link 111, remote data link 107, and a replication manager/data link connecting replication manager 104 with data storage 101-102. QoS monitor 108 may be configured to determine one or more performance parameters associated with data storage system 100. In one embodiment, QoS monitor 108 may examine data traffic transmitted over link 111 and report statistical information to QoS manager 106. For example, QoS monitor 108 may determine a total number of packets transmitted across link 111 (total throughput), a maximum bandwidth of the link (link capacity), an I/O queue depth, a number of I/O execution threads, and a maximum and/or average I/O response time. Additionally, QoS monitor 108 may associate any performance parameter metric with a specific application so that QoS manager 106 may determine, for example, how much I/O is being serviced by data storage system 100 and how timely those I/O requests are being processed.

Figure 2:
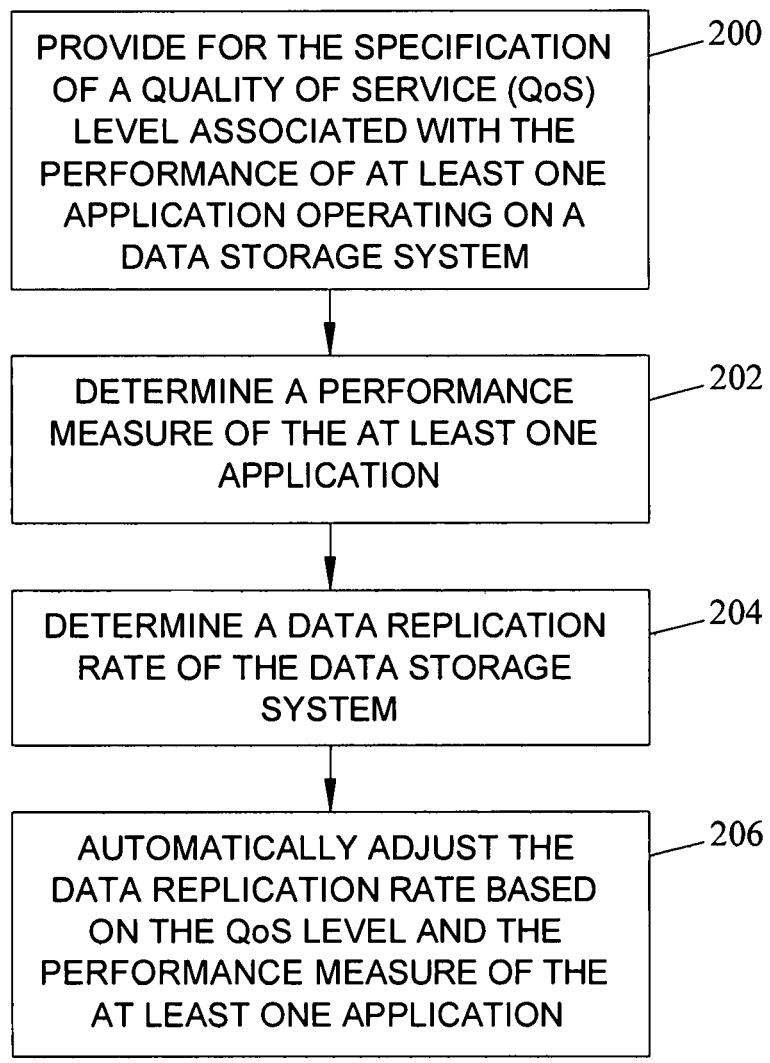
FIG. 2 is a flow chart of an exemplary process for automatically adjusting a data replication rate based on a specified QoS level according to an embodiment of the subject matter described herein.

FIG. 2 is a flow chart of exemplary steps for automatically adjusting a replication rate based on a specified QoS level according to an embodiment of the subject matter described herein. Referring to FIG. 2, in block 200, a QoS level may be specified for applications 116-120 and may include different types. In one embodiment, I/O requests may be prioritized in order to meet a targeted performance goal, with or without a specified tolerance range. In another embodiment, the I/O performance of an application may be throttled by queuing I/O requests which, if processed immediately, would result in exceeding the specified I/O performance limit. In yet another embodiment, the amount of I/O processed by the application may be directly controlled. For example, a first QoS level may specify that application 116 must initiate and complete a replication of all data between 12 am-3 am. A second QoS level may specify that application 118 must have available to it no less than 70% of available bandwidth between 8 am-6 pm. And a third QoS level may specify that application 120 may only process 1 I/O operation per second.

In block 202, a performance measure of the at least one application is determined. In order to meet QoS levels provided by the user, QoS manager 106 may determine various performance parameters of data storage system 100. These performance parameters can include, but are not limited to, CPU utilization, bandwidth for any link, jitter, delay, and I/O queue depth. It is appreciated that in addition to the communications links connecting components within data storage system 100, QoS manager 106 may also monitor communications links between data storage system 100 and remote data storage arrays without departing from the scope of the subject matter described herein.

In block 204, a replication rate of the data storage and replication system is determined. For example, replication manager 104 may determine one or more performance parameters associated with data replication and communicate their values to QoS manager 106. As described above, exemplary performance that may be associated with data replication may include a total I/O throughput for replication operations.

In block 206, the replication rate is automatically adjusted based on the QoS level and the performance measure. For example, in one embodiment, QoS manager 106 may prioritize I/O requests such that a target application's performance meets a targeted goal, within a specified tolerance range. This type of QoS level is hereinafter referred to as "cruise control." Accordingly, QoS manager 106 may reserve a higher percentage of available resources for the target application in order to achieve a high performance objective or, conversely, may restrict the amount of resources available to the application in order to suppress its performance for achieving a lower performance objective. QoS manager 106 may also more quickly process I/O requests associated with a higher-priority application by inserting the I/O requests ahead of all other I/O requests or by maintaining a separate I/O queue which is processed before all other queues.

As described above, performance objectives (i.e. QoS levels) can be expressed in a variety of terms. In the example above, the performance objective for the backup application may be expressed in terms of requiring that the backup process be completed within the 3-hour time window between 12 am and 3 am.

In another embodiment, QoS manager 106 may limit the I/O performance of an application by queuing I/O requests which, if processed immediately, would result in exceeding the specified I/O performance limit. This type of QoS level is hereinafter referred to as a "limit" QoS level.

In another embodiment, QoS manager 106 may directly control of the amount of I/O processed by the application is performed. This type of QoS level is hereinafter referred to as a "fixed queue depth" QoS level.

Figure 3:
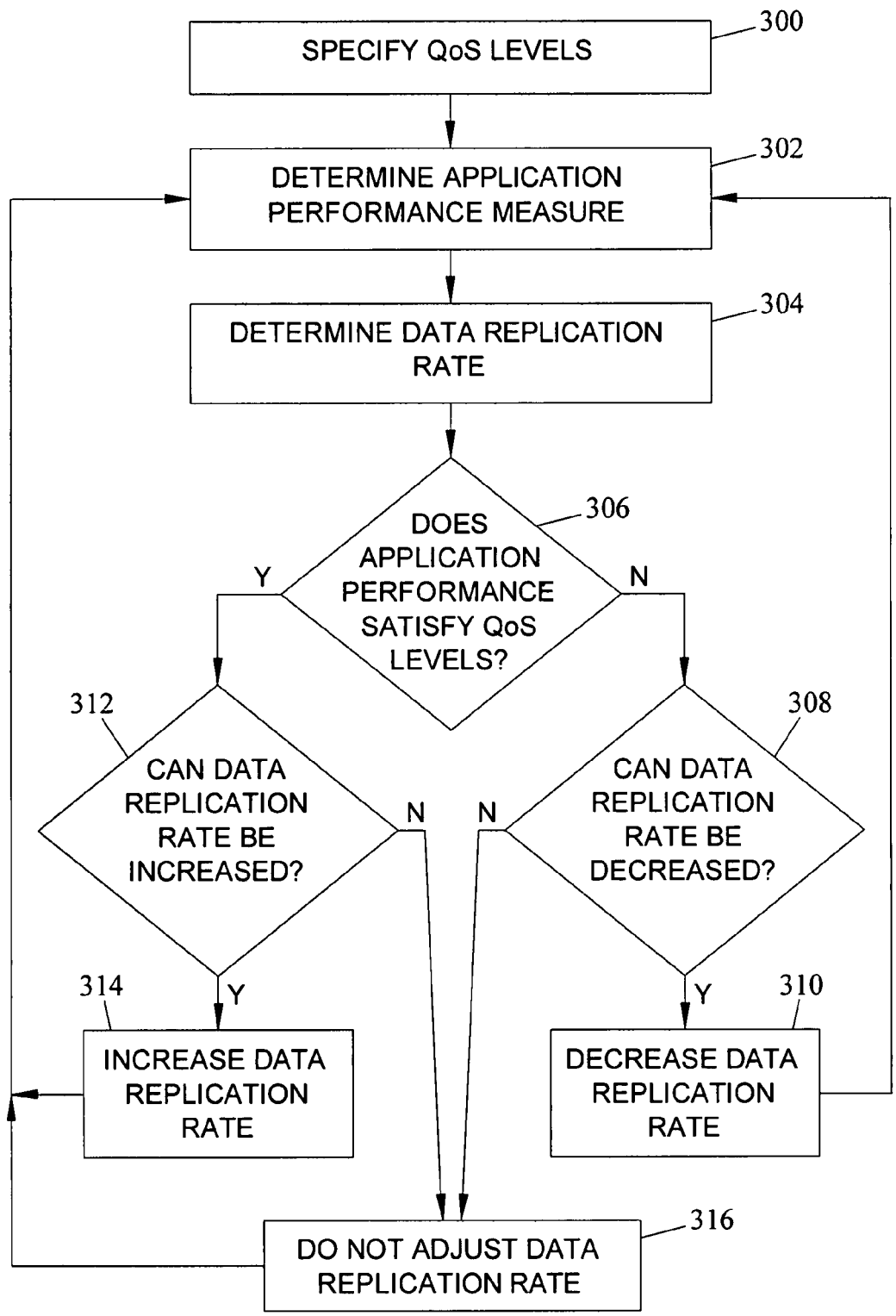
FIG. 3 is a flow chart of exemplary steps for automatically adjusting a data replication rate based on a specified QoS level according to an embodiment of the subject matter described herein.

FIG. 3 is a more detailed flow chart of exemplary steps for automatically adjusting a replication rate based on a specified QoS level according to an embodiment of the subject matter described herein. Referring to FIG. 3, in block 300, one or more specified QoS levels are retrieved. For example, QoS manager 106 may retrieve one or more QoS levels from QoS data structures 110. In an exemplary scenario, the retrieved QoS levels may include a QoS level specifying that the maximum allowable access time for a first application is 20 ms.

In block 302, the performance of one or more applications is determined. For example, QoS monitor 108 may measure the access time for I/O requests associated with a first application. This may be accomplished, for example, by examining packets traversing communications link 111.

In block 304, a replication rate is determined, where the replication rate affects the amount of shared system resources available to applications 114. The replication rate may be measured in a similar manner to that described above with respect to block 302.

In block 306, it is determined whether the application performance measured in block 302 satisfies the QoS levels retrieved in block 300. Based on the result of this determination, the replication rate may be adjusted to more efficiently allocate system resources among applications and replication processes.

If the result of the determination made in block 306 indicates that the performance of the application does not satisfy its associated QoS level, it is determined whether the replication rate may be decreased. By decreasing the replication rate, additional resources may be made available to the application and its QoS levels may be satisfied. However, if the replication rate cannot be decreased further (e.g. it is zero), then no request to further reduce the replication rate is necessary. If the determination in block 308 indicates that the replication rate can be decreased, control proceeds to block 310 where the replication rate is decreased by adjusting one or more performance parameters. Alternatively, if the determination in block 308 indicates that the replication rate cannot be decreased any further, control proceeds to block 312 where the replication rate is not adjusted and control returns to block 302 where application performance is measured again.

In one embodiment, upon determining that adjustment of the replication rate is necessary in order to satisfy the one or more QoS levels in block 310, QoS manager 106 may send a "slow down" message to replication manager 104 for execution. For example, a binary signal may be transmitted where 0 is associated with "slow down" and 1 is associated with "speed up". In the simplest scenario, the slow down signal may be interpreted by replication manager 104 to stop performing all replication operations. This may include prohibiting all replication applications from placing I/O requests on the queue for data storage 100.

Returning to block 306, if the determined application performance satisfies associated QoS levels, the replication rate may potentially be increased without causing the application to fail to meet its QoS objectives. By increasing the replication rate while simultaneously maintaining the satisfaction of applicable QoS levels, overall system performance may be increased. Therefore, if it is determined in block 312 that the replication rate can be increased, control proceeds to block 314 where the replication rate is increased. As described above, a speed up signal may be interpreted by replication manager 104 to maximize the replication rate. This may include maximizing the priority of I/O replication operations, maximizing the number of I/O threads, maximizing the CPU utilization, or the adjustment of other performance parameters. After increasing or decreasing the replication rate in either block 310 or 314, control may return to block 302 where application performance is again determined.

In another embodiment, in response to detecting a "speed up" message from QoS manager 106, replication manager 104 may maintain a prioritized list containing performance parameter settings associated with different replication rates. For example, the list may contain six settings with the first setting being associated with the highest performance level and the sixth setting being associated with the lowest priority level. A default value for replication applications may be initially set at the third setting. In this embodiment, each setting may correspond to a number of execution threads associated with data replication, where the maximum number of threads is five and the minimum number of threads is zero. Upon receiving a first speed up message from QoS manager 106, replication manager 104 may adjust one or more performance parameters in accordance with level 2 indicated in the priority list (i.e. increase the number of threads from 3 to 4). Alternately, upon receiving a first slow down message, replication manager 106 may decrease the number of threads from 3 to 2 as indicated by priority level 4. The embodiment described above thus provides greater granularity when interpreting replication rate adjustment messages received from QoS manager 106.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for automatically adjusting a replication rate in a data storage system, the method comprising:
   providing a data replication process that replicates data stored by the data storage system;

providing for the specification of a quality of service (QoS) level associated with the performance of at least one non-replication application operating on a data storage system, wherein the at least one non-replication application and the data replication process access shared resources of the data storage system;

determining a performance measure of the at least one non-replication application, wherein determining a performance measure of the at least one non-replication application includes measuring an access time for input/output (I/O) requests associated with the at least one non-replication application by examining packets traversing a communications link between the at least one non-replication application and a data storage device;

determining a data replication rate of the data storage system available to the data replication process; and automatically adjusting the data replication rate based on the QoS level and the performance measure of the at least one non-replication application, wherein automatically adjusting the data replication rate includes adjusting the speed at which data is copied by the data replication process from a source to a destination based on the QoS level of the at least one non-replication application and the measured access time for the I/O requests of the at least one non-replication application, wherein automatically adjusting the data replication rate includes, in response to a determination that the QoS level of the at least one non-replication application is being satisfied, sending a speed-up message from a QoS manager to a replication manager and wherein, in response to receiving the speed-up message, the replication manager increases a number of replication threads from a default number greater than zero to a second number higher than the default number and wherein automatically adjusting the data replication rate includes maintaining a performance parameter adjustment priority list containing a plurality of performance parameters associated with a plurality of priority values and adjusting performance parameters based on the priority values in the list.

2. The method of claim 1 wherein providing for the specification of a QoS level includes providing one of a QoS level via one of a graphical user interface (GUI) and a command line interface (CLI).

3. The method of claim 1 wherein providing for the specification of a QoS level includes providing for the specification of at least one of an I/O queue depth, a link bandwidth, an I/O operation throughput, and an I/O operation completion time.

4. The method of claim 1 wherein determining the performance measure of the at least one application includes determining at least one of an I/O queue depth, a link bandwidth, an I/O operation throughput, and an I/O operation completion time.

5. The method of claim 1 wherein determining the data replication rate includes determining a total I/O operation throughput associated with the replication of data within the data storage system.

6. The method of claim 1 wherein automatically adjusting the data replication rate includes automatically reducing the data replication rate in response to determining that the performance measure does not satisfy the QoS level.

7. The method of claim 1 wherein automatically adjusting the replication rate includes automatically increasing the replication rate in response to determining that the performance measure exceeds the QoS level.

8. The method of claim 1 wherein automatically adjusting the data replication rate includes adjusting at least one of a rate at which mirroring operations and snapshot operations are performed on a disk array.

9. The method of claim 1 wherein automatically adjusting the data replication rate includes adjusting at least one of an I/O queue depth, a link bandwidth, an I/O operation throughput, and an I/O operation completion time.

10. A data storage and replication system for automatically adjusting a data replication rate based on a specified QoS, the system comprising:

a processor;

a data storage array that stores data;

a data replication process that replicates data stored by the data storage array;

a replication manager communicatively coupled to the data storage array for adjusting the data replication rate of data located on the data storage array available to the data replication process, wherein adjusting the data replication rate includes receiving one or more instructions associated with the data replication rate and adjusting one or more performance parameters; and a quality of service (QoS) manager that:

provides for the specification of a quality of service (QoS) level associated with the performance of at least one non-replication application operating on a data storage system, wherein the at least one non-replication application and the data replication process access shared resources of the data storage system;

determines a performance measure of the at least one application, wherein determining a performance measure of the at least one non-replication application includes measuring an access time for input/output (I/O) requests associated with the at least one non-replication application by examining packets traversing a communications link between the at least one non-replication application and a data storage device;

determines the data replication rate of the data storage system available to the data replication process; and automatically adjusts the data replication rate based on the QoS level and the performance of the at least one non-replication application, wherein automatically adjusting the data replication rate includes adjusting the speed at which data is copied by the data replication process from a source to a destination based on the QoS level of the at least one non-replication application and the measured access times for the I/O requests associated with the at least one non-replication application, wherein automatically adjusting the data replication rate includes, in response to a determination that the QoS level of the at least one non-replication application is being satisfied, sending a speed-up message from the QoS manager to the replication manager and wherein, in response to receiving the speed-up message, the replication manager increases a number of replication threads from a default number greater than zero to a second number higher than the default number and wherein automatically adjusting the data replication rate includes maintaining a performance parameter adjustment priority list containing a plurality of performance parameters associated with a plurality of priority values and adjusting performance parameters based on the priority values in the list.

11. The data storage and replication system of claim 10 comprising a QoS data structure for storing the QoS level, wherein the QoS data structure is communicatively coupled to the QoS manager.

12. The data storage and replication system of claim 10 wherein the QoS manager receives the QoS level via one of a graphical user interface (GUI) and a command line interface (CLI).

13. The data storage and replication system of claim 10 wherein the QoS manager provides for the specification of at least one of an I/O queue depth, a link bandwidth, an I/O operation throughput, and an I/O operation completion time.

14. The data storage and replication system of claim 10 comprising a QoS monitoring agent for determining at least one of an I/O queue depth, a link bandwidth, an I/O operation throughput, and an I/O operation completion time.

15. The data storage and replication system of claim 10 wherein the QoS manager determines a total I/O operation throughput associated with the data replication of data within the data storage and replication system.

16. The data storage and replication system of claim 10 wherein the QoS manager automatically reduces the data replication rate in response to determining that the application performance measure does not satisfy the QoS level.

17. The data storage and replication system of claim 10 wherein the QoS manager automatically increases the data replication rate in response to determining that the application performance measure exceeds the QoS level.

18. The data storage and replication system of claim 10 wherein the QoS manager automatically adjusts at least one of a rate at which mirroring operations and snapshot operations are performed on a disk array.

19. The data storage and replication system of claim 10 wherein the QoS manager automatically adjusts at least one of an I/O queue depth, a link bandwidth, an I/O operation throughput, and an I/O operation completion time.

20. A computer program product comprising computer-executable instructions embodied in a non-transitory computer-readable medium for performing steps comprising:

providing a data replication process that replicates data stored by the data storage system;

providing for the specification of a quality of service (QoS) level associated with at least one non-replication application operating on a data storage system, wherein the at least one non-replication application and the data replication process access shared resources of the data storage system;

determining a performance measure of the at least one non-replication application, wherein determining a performance measure of the at least one non-replication application includes measuring an access time for input/output (I/O) requests associated with the at least one non-replication application by examining packets traversing a communications link between the at least one non-replication application and a data storage device;

determining a data replication rate of the data storage system available to the data replication process; and automatically adjusting the data replication rate based on the QoS level and the performance of the at least one non-replication application, wherein automatically adjusting the data replication rate includes adjusting the speed at which data is copied by the data replication process from a source to a destination based on the QoS level of the at least one non-replication application and the measured access time for the I/O requests of the at least one non-replication application, wherein automatically adjusting the data replication rate includes, in response to a determination that the QoS level of the at least one non-replication application is being satisfied, sending a speed-up message from a QoS manager to a replication manager and wherein, in response to receiving the speed-up message, the replication manager increases a number of replication threads from a default number greater than zero to a second number higher than the default number and wherein automatically adjusting the data replication rate includes maintaining a performance parameter adjustment priority list containing a plurality of performance parameters associated with a plurality of priority values and adjusting performance parameters based on the priority values in the list.

* * * * *